A. W. DAVIS.
Harrow.
No. 165,480. Patented July 13, 1875.
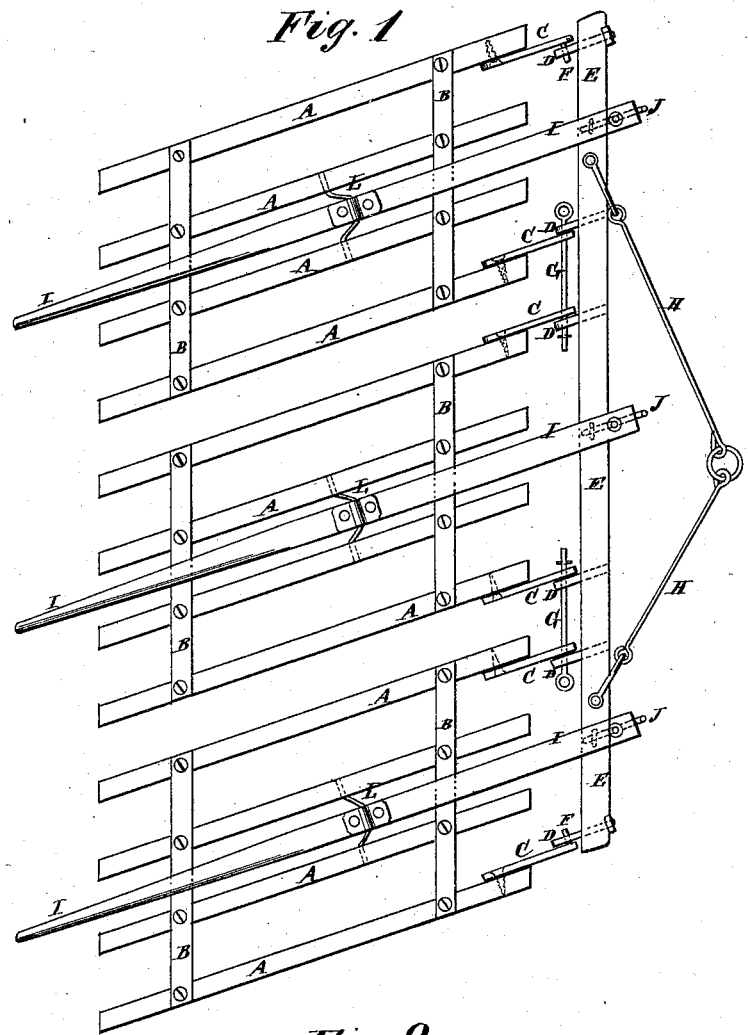
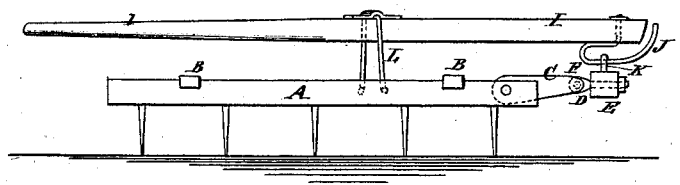
WITNESSES:
INVENTOR:
A. W. Davis
BY
ATTORNEYS.

UNITED STATES PATENT OFFICE.

ADOLPHUS W. DAVIS, OF DWIGHT, ILLINOIS.

IMPROVEMENT IN HARROWS.

Specification forming part of Letters Patent No. 165,480, dated July 13, 1875; application filed May 22, 1875.

*To all whom it may concern:*

Be it known that I, ADOLPHUS W. DAVIS, of Dwight, in the county of Livingston and State of Illinois, have invented a new and useful Improvement in Harrow, of which the following is a specification:

Figure 1 is a top view of my improved harrow. Fig. 2 is a side view of the same.

Similar letters of reference indicate corresponding parts.

The object of this invention is to furnish an improved harrow, which shall be so constructed as to adjust itself to uneven ground, which will allow either of its sections to be raised from the ground without affecting the others, and which shall be simple in construction and effective in operation.

The invention consists in the combination of the three diamond-shaped sections of the harrow-frame, the pivoted connecting-bars, the pivoting-pins, the eyebolts, and the long draft-bar with each other; in the combination of the levers, the long hooks, the eyebolts or staples, and the U-shaped pivoted standards with the draft-bar and the sections of the harrow-frame.

The harrow-frame is made in three sections, each of which is formed of four longitudinal bars, A, rigidly connected near their front and rear ends by two cross-bars, B, in such a way that the said sections may be diamond-shaped. To the inner sides of the side bars A of each section are pivoted the rear ends of short bars or plates C, the forward ends of which are pivoted to the eyes of eyebolts D attached to the long draft-bar E, where they are secured in place by nuts screwed upon their forward ends. The forward ends of the outer bars C are pivoted to their eyebolts by short pins F, permanently attached to said bars, and which pass through the eyes of the said eyebolts. The other bars C are pivoted to their eyebolts in pairs by long pins G, which are secured in place by keys.

This construction, while keeping the sections in their proper relative positions, allows either of said sections to be raised from the ground vertically, or either end first.

H are the draft-rods, the forward ends of which are connected by a ring, to which the double-tree clevis is attached. The rear ends of the rods H are connected with the draft-bar E near its ends by clevises. I are levers, to the under side of the forward ends of which are attached long hooks J, the ends of which project across and at a little distance from the ends of the said levers I. The hooks J are passed through staples or eyebolts K, attached to the upper side of the draft-bar E. To the middle parts of the levers I are pivoted the bends of the U-rods L, the ends of the arms of which are bent outward at right angles, and are inserted in holes in the adjacent sides of the middle longitudinal bars of the sections of the harrow-frame. The rear ends of the levers I project in the rear of the harrow-frame, and are about as high from the ground as a man's knee, so that they may be grasped and operated by the driver without his having to stoop so much as to take his eyes from the horses.

By this construction by pushing one of the levers I forward, and then raising its rear end, the forward end of the section will be raised from the ground, and then, as the upward movement of the lever is continued, the whole section will be raised from the ground. In the same way, by drawing the lever to the rearward, and then raising its rear end, the section will be raised rear end first.

Having thus described my invention, I claim as new and desire to secure by Letters Patent—

1. The combination of the three diamond-shaped sections A B of the harrow-frame, the pivoted connecting-bars C, the pivoting-pins F G, the eyebolts D, and the long draft-bar E, with each other, substantially as herein shown and described.

2. The combination of the levers I, the long hooks J, the eyebolts or staples K, and the U-shaped pivoted standards L, with the draft-bar E, and the sections A B of the harrow-frame, substantially as herein shown and described.

ADOLPHUS W. DAVIS.

Witnesses:
 S. H. KENNEY,
 JAMES G. STRONG.